United States Patent [19]

Borglum

[11] 3,728,224

[45] Apr. 17, 1973

[54] ENZYME PURIFICATION PROCESS

[75] Inventor: Gerald Baltzer Borglum, Elkhart, Ind.

[73] Assignee: Miles Laboratories, Inc., Elkhart, Ind.

[22] Filed: Nov. 12, 1970

[21] Appl. No.: 89,092

[52] U.S. Cl. .................................................195/66 R
[51] Int. Cl. .................................................C07g 7/02
[58] Field of Search .....................................195/66 R

[56] References Cited

UNITED STATES PATENTS

| | | | |
|---|---|---|---|
| 3,297,546 | 1/1967 | Johnson et al. | 195/66 R X |
| 3,592,737 | 7/1971 | Keay et al. | 195/66 R |
| 3,622,462 | 11/1971 | Delin et al. | 195/66 R |

*Primary Examiner*—Lionel M. Shapiro
*Attorney*—Joseph C. Schwalbach, Louis E. Davidson, Harry T. Stephenson and George R. Caruso

[57] ABSTRACT

An enzyme solution containing various impurities can be purified by mixing said solution with a quaternary ammonium compound to form a precipitate between the impurities and the added compound and then separating said precipitate from the so-purified solution. This process is especially useful to treat an enzyme solution that is subsequently to be concentrated in an ultrafiltration procedure.

8 Claims, No Drawings

ENZYME PURIFICATION PROCESS

BACKGROUND AND PRIOR ART

Enzymes are materials which are known to be capable of catalyzing certain reactions. Proteases, for example, are enzymes which are known to be capable of catalyzing the hydrolysis of proteinaceous materials. This property is useful, for example, for tenderizing of meat and for the removal of protein stains on clothes. Certain proteases have generally been prepared in the prior art by growing a culture of a suitable organism, such as *Bacillus subtilis*, in an appropriate nutrient medium, filtering off the bacterial cells, then adding ammonium sulfate or an organic solvent, such as ethanol, to precipitate the protease. The resulting protease precipitate, even after being washed with water or organic solvent, contains significant amounts of carbohydrates and non-enzymatic nitrogen compounds, for example, from the fermentation beer in which it was produced. These impurities can add undesirable color and odor to the precipitated protease which might render the protease unsuitable for certain end uses, such as inclusion in detergent enzyme compositions. Similar problems occur when the protease solution is spray-dried to form a protease powder.

It was suggested in the prior art that ultrafiltration techniques could be employed to remove the above undesirable impurities from the enzyme solutions and at the same time concentrate such solutions by removing appreciable amounts of the solvent. These ultrafiltration techniques were generally successful in removing the color and odor producing impurities and in concentrating the enzyme solutions, but the membranes employed in such techniques were being undesirably plugged by other impurities in the enzyme solutions, such as nucleic acids and non-enzymatic proteins resulting probably from bacterial cell degradation during the enzyme production process.

It is an object of the present invention to remove impurities from enzyme solutions.

It is a further object to remove impurities from enzyme solutions which tend to plug membranes used in ultrafiltration techniques which are employed to concentrate such enzyme solutions.

SUMMARY OF THE INVENTION

In accordance with the present invention, a process is provided for the removal of impurities from an enzyme solution which comprises mixing an impurity-containing enzyme solution with a quaternary ammonium compound to form a precipitate between the impurities and such quaternary ammonium compound and then separating said precipitate from the enzyme solution.

DESCRIPTION OF THE INVENTION

The enzyme solutions used as raw materials for the process of the present invention are well-known in the art. A protease-containing solution, for example, also containing impurities is obtained by fermenting in a well-known manner an aqueous nutrient medium with a selected strain of *Bacillus subtilis* and then filtering off the bacterial cells and insoluble medium components. Protease-containing solutions from other sources can also be used. *Bacillus subtilis*, for example, also produces an amylase which can be purified by the present process. Amylase-containing solutions from other sources can also be used.

Exemplary quaternary ammonium compounds that can be used in the present invention are: N-alkyl-N-dimethylbenzyl ammonium chloride wherein the alkyl radical is a straight chain containing from 12 to 16 carbon atoms; N-alkyl-N-dimethylbenzyl ammonium chloride wherein the alkyl radical is a straight chain containing from eight to 18 carbon atoms; diisobutylphenoxyethoxyethyldimethylbenzyl ammonium chloride; diisobutylcresoxyethyoxyethyldimethylbenzyl ammonium chloride; diisobutylcresoxyethoxyethyldimethylbenzyl ammonium chloride; stearyldimethylbenzyl ammonium chloride; alkyldimethylethylbenzyl ammonium chlorides; alkyldimethyl-3,4-dichlorobenzyl ammonium chlorides; methyldodecylbenzyltrimethyl ammonium chloride; tallowdimethylbenzyl ammonium chloride; dicocodimethyl ammonium chloride; disoyadimethyl ammonium chloride; distearyldimethyl ammonium chloride; alkyltrimethyl ammonium chlorides wherein the alkyl radicals may be dodecyl, tetradecyl, hexadecyl or octadecyl; methyldodecylxylene bis(trimethyl ammonium chloride); cetyltrimethyl ammonium bromide; tallowtrimethyl ammonium chloride; phenyltrimethyl ammonium chloride; alkyldimethylnaphthyl ammonium chlorides; cetylpyridinium chloride; cetyldimethylethyl ammonium chloride; propoxylated ammonium methyl sulfates; ditallowdimethyl ammonium methyl sulfate; and the like. In the above compounds, unless otherwise defined, the expression "alkyl" refers to a straight or branched chain monovalent saturated hydrocarbon radical containing one or more carbon atoms. Generally, the expression "alkyl" refers to a straight chain monovalent hydrocarbon radical containing from about 12 to about 20 carbon atoms.

The quaternary ammonium compound is added in an amount from about 0.05 to about 0.5 percent (weight/volume basis) based on the volume of the enzyme solution. Preferably, the quaternary ammonium compound is added in an amount from about 0.1 to about 0.5 percent (weight/volume basis) based on the volume of the enzyme solution. The above concentrations provide an adequate amount of material to form a precipitate with the impurities to be removed and also provide a residual amount of quaternary ammonium compound to act as a preservative to prevent bacterial growth in the enzyme solution during subsequent processing.

The enzyme solution should have a pH in the range from about 5.0 to about 6.5 when the quaternary ammonium compound is added. If the pH is below about 5.0, the enzymes tend to become unstable. If the pH is above about 6.5, the enzymes become negatively charged and react with the quaternary ammonium compound.

In order to retard any undesirable bacterial action and to retain maximum enzyme activity, the present process is desirably carried out in the temperature range from about 50° F. (10° C.) to about 77° F. (25° C.).

The resulting precipitate can be collected and separated from the so-purified enzyme solution by well-known techniques, such as filtration, centrifugation and decantation.

The present invention is especially useful to treat enzyme solutions which are subsequently to be concentrated and further purified in an ultrafiltration procedure. In such ultrafiltration procedure an enzyme solution is applied under pressure against a selectively-permeable membrane which allows a large portion of the solution solvent as well as significant portions of any impurities present to pass through such membrane, thereby resulting in a residual concentrated enzyme-containing solution which also contains reduced amounts of impurities. There is also a minimal loss of enzyme activity in the material which passes through the membrane.

Pre-treatment of the enzyme solution in accordance with the present invention removes a significant amount of the impurities which previously caused fouling of the selectively-permeable membrane when the enzyme solution is concentrated by ultrafiltration.

Any selectively-permeable membrane which allows the passage of water, non-enzymatic nitrogen compounds, carbohydrates, salts and other impurities, but which restricts the passage of the desired enzyme, such as protease and amylase, can be employed in this process. Cellulose acetate membranes have been found preferable for this purpose. Other useful membrane materials are cellulose triacetate, cellulose acetate-butyrate, beta glucan acetate, and cellulose propionate. The specific porosity of such membranes for use in concentration of enzyme solutions can be controlled during their manufacture by well-known procedures. For example, a membrane can be cast from a mixture of cellulose acetate, acetone and formamide. When the solvents evaporate, the resulting cellulose acetate film has desirable selective-permeability characteristics. The permeability is a known function of the viscosity of the cellulose acetate and the cellulose acetate molecular weight distribution. The permeability of the membrane can also be controlled by varying the water content of the final membrane prepared from an aqueous cellulose acetate solution. This water content can be controlled by including an inorganic electrolyte, such as magnesium perchlorate, or an organic swelling agent, such as tartaric acid, in the membrane-forming composition.

Ultrafiltration concentration of enzyme solutions purified by the process of the present invention is conveniently carried out with a pressure differential across the selectively-permeable membrane of from about 10 to about 500 psig. Under the normally anticipated operating conditions wherein substantially atmospheric pressure conditions are maintained downstream of the membrane, the pressure of the enzyme solution, such as a protease-containing solution, applied against the membrane is thus from about 10 to about 500 psig.

The invention will be described in further detail in the following examples.

EXAMPLE 1

A crude aqueous protease and amylase-containing solution also containing various impurities was obtained by fermenting in a well-known manner an aqueous nutrient medium with a selected strain of *Bacillus subtilis* and then filtering off the bacterial cells and insoluble components of the medium. A 400 ml. portion of this filtrate was adjusted to pH 6.5 and retained as a "Control." A second 400 ml. portion of this filtrate was adjusted to pH 6.5 and was mixed at room temperature (about 75° F.) with a 50 weight percent aqueous solution of N-alkyl-N-dimethyl-N-benzyl ammonium chloride wherein the alkyl radical contains from 12 to 16 carbon atoms to provide a concentration of 0.5 percent (weight/volume basis) of the quaternary ammonium compound based on the volume of the enzyme solution. This quaternary ammonium compound is marketed under the trade name Cyncal by the Hilton-Davis Chemical Co., a division of Sterling Drug Co. The resulting precipitate was removed by filtration. The resulting filtrate contained the same total protease and amylase activities as the enzyme solution prior to mixture with the quaternary ammonium compound.

The "Control" filtrate was then placed in a small scale ultrafiltration chamber on one side of a semi-permeable membrane. This membrane was fabricated from cellulose acetate and was 0.005 in. thick. This membrane will pass 93 percent of a 10 weight percent aqueous sucrose solution under a maximum membrane pressure differential of 200 psig. It is marketed under the designation No. 207 by the American-Standard Co. A pressure of 20 psig. was applied to the above purified enzyme solution on one side of the membrane while atmospheric pressure was applied on the other side. Liquid permeate passed through the membrane while the volume of the retained concentrate decreased. Substantially all the original enzyme activity was retained in the concentrate and only a negligible amount passed through the membrane into the permeate. The volume of permeate versus time was measured and plotted with the volume along the abscissa.

The above filtrate resulting from treatment with the quaternary ammonium compound was placed in the same ultrafiltration apparatus and the above procedure was repeated using the same membrane which had been cleaned prior to reuse by well-known techniques. If ultrafiltration membranes are reused without being cleaned prior to reuse, undesirable bacterial and/or fungal growth might take place in the membranes which would tend to plug the membranes. In this small scale apparatus the membrane is readily accessible so that the normal cleaning procedure results in a substantially fresh membrane. The volume of resulting permeate versus time was measured and plotted. The slope of the plot for the enzyme solution treated with the quaternary ammonium compound was less than that of the Control indicating that the liquid flux rate was higher than for the Control. The impurities removed by the quaternary ammonium compound did not have the opportunity to plug the pores in the membrane as occurred when the Control was used.

EXAMPLE 2

A further 400 ml. portion of the original enzyme solution filtrate obtained in Example 1 was adjusted to pH 6.5 and was mixed at room temperature with the quaternary ammonium compound of Example 1 to provide a concentration of 0.2 percent (weight/volume basis). The resulting precipitate was removed by filtration and the resulting filtrate was placed in the same ultrafiltration apparatus and processed in the same manner as described in Example 1 using the same membrane which had been cleaned prior to reuse. The volume of resulting permeate versus time was measured and plotted. The slope of the plot was less than that of the corresponding plot in Example 1 using the Control filtrate but was not as low as that obtained using 0.5 percent quaternary ammonium compound to treat the enzyme solution. This indicated that 0.2 percent quaternary ammonium compound removed impurities but that increased amounts of membrane plugging impurities were being removed by the higher concentration (0.5 percent) of quaternary ammonium compound.

EXAMPLE 3

An aqueous protease and amylase-containing solution also containing some impurities was obtained by fermenting in a well-known manner an aqueous nutrient medium with a selected strain of *Bacillus subtilis* and then filtering off the bacterial cells and insoluble components of the medium. One portion of the filtrate was retained as a Control. Another portion was adjusted to pH 5.45 and was mixed at 50°–75° F. with the quaternary ammonium compound of Example 1 to provide a concentration of 0.1 percent (weight/volume basis). The resulting precipitate was removed by filtration. The resulting filtrate was divided into two substantially equal portions each about 79–80 gallons. One of these portions was introduced to commercial scale ultra-filtration apparatus having a semi-permeable cellulose acetate membrane 0.004 in. thick. This membrane will pass 95 percent of a 10 weight percent aqueous sucrose solution under a maximum pressure differential of 200 psig. It is marketed under the designation Type 215 by Havens International Co. This filtrate was introduced to the apparatus under an input pump pressure of 400 psig. and at a rate of 2 gal. per min. The amount of permeate liquid that passed through the membrane in gallons per square foot of membrane per day (from 10 to 5) was measured and plotted against the dissolved solids concentration in the retained concentrate expressed as percent Abbe along the abscissa (from 4 to 14). The Abbe measurement actually involves the index of refraction of the concentrate and is an indication of concentration. As the percent Abbe increases, the concentration of enzymes in the concentrate increases.

The second portion of the treated filtrate was then introduced to the same apparatus and processed in the same manner as described above for the first portion reusing the same membrane. The membrane was cleaned prior to reuse by normal flushing techniques. The plot of permeate liquid flux rate (from 9 to 5) versus percent Abbe (from 9 to 14) was substantially identical to that obtained for the first portion indicating that the membrane was not being plugged by impurities from the first or second portions.

The above Control filtrate which had not been treated with the quaternary ammonium compound was divided into a first 80 gal. portion and a second 100 gal. portion. The first portion was introduced into the above ultrafiltration apparatus having a fresh membrane under the same pressure and flow rate conditions employed above. The permeate liquid flux rate (from 10 to 4) versus the percent Abbe (from 4 to 12) was measured and plotted. The slope of the plot was greater than that obtained for the above treated filtrate indicating that plugging of the membrane was greatly decreasing the flow rate. The second portion of the Control filtrate was then introduced to the apparatus under the same conditions reusing the same membrane used for the first portion of the Control. The membrane was cleaned prior to reuse by normal flushing techniques. The permeate liquid flux rate (from 10 to 2) versus percent Abbe (from 4 to 10) was measured and plotted. The slope of this latter curve was greater than that for the first portion of the Control indicating further plugging by the second portion.

This example clearly shows the further advantage of the subject invention in treating enzyme solutions which are subsequently to be concentrated by ultrafiltration apparatus in that the apparatus membranes can be reused with only normal flushing techniques between reuse without plugging of the membranes.

EXAMPLE 4

An aqueous protease and amylase-containing solution also containing some impurities was obtained by fermenting in a well-known manner an aqueous medium with a selected strain of *Bacillus subtilis* and then filtering off the bacterial cells and insoluble components of the medium. The filtrate was adjusted to pH 6.18 and was mixed at 50°–77° F. with an aqueous solution of N-alkyl-N-dimethyl-N-benzyl ammonium chloride wherein the alkyl radical contains from 8 to 18 carbon atoms to provide a concentration of 0.1 percent (weight/volume basis) of the quaternary ammonium compound based on the volume of the enzyme solution. This quaternary ammonium compound is marketed under the trade name Roccal by the Hilton-Davis Chemical Co., a division of Sterling Drug Co. The resulting precipitate was removed by filtration. The resulting filtrate was divided into a first portion of 101 gal. and a second portion of 104 gal. The first portion was introduced into commercial scale ultrafiltration apparatus of the type described in Example 3 having substantially fresh membranes. This filtrate was introduced to the apparatus under an input pump pressure of 200 psig. and at a rate of 1 gal. per min. The amount of permeate liquid that passed through the membrane in gallons per square foot of membrane per day (from 6 to 3) was measured and plotted against the dissolved solids concentration in the retained concentrate expressed as percent Abbe (from 4 to 11).

The second portion of the above-treated filtrate was then introduced to the same apparatus and processed in the same manner continuing to reuse the same membrane with only normal flushing techniques used to clean the membrane prior to reuse. The plot of permeate liquid flux rate (from 6 to 3) versus percent Abbe (from 4 to 11) was substantially identical to that obtained for the first portion indicating that the membrane was not being plugged by impurities from the first or second portions.

The above examples describe the treatment of a mixture of protease and amylase. The present invention is also suitable for treatment of enzyme solutions containing protease alone or amylase alone.

What is claimed is:

1. A process for the removal of impurities from a *Bacillus subtilis* enzyme solution containing enzymatic activities selected from the class consisting of protease and amylase which comprises mixing such impurity-containing enzyme solution at a pH between about 5.0 and 6.5 with a quaternary ammonium compound alone to form a precipitate between the impurities and such quaternary ammonium compound and then separating said precipitate from the enzyme solution.

2. A process according to claim 1 wherein the quaternary ammonium compound is added to the enzyme solution in an amount from about 0.05 to about 0.5 percent (weight/volume basis) based on the volume of the enzyme solution.

3. A process according to claim 1 wherein the quaternary ammonium compound is added to the enzyme solution in an amount from about 0.1 to about 0.5 percent (weight/volume basis) based on the volume of the enzyme solution.

4. A process according to claim 1 wherein the quaternary ammonium compound is an N-alkyl-N-dimethyl-N-benzyl ammonium chloride wherein the alkyl radical contains from eight to 18 carbon atoms.

5. A process according to claim 1 wherein the quaternary ammonium compound is an N-alkyl-N-dimethyl-N-benzyl ammonium chloride wherein the alkyl radical contains from 12 to 16 carbon atoms.

6. A process according to claim 1 wherein after separating the precipitate therefrom the enzyme solution is concentrated by applying such solution under pressure against a selectively-permeable membrane which allows a large portion of the solution solvent to pass through such membranes, thereby resulting in a residual concentrated enzyme-containing solution.

7. A process according to claim 6 wherein the selectively-permeable membrane is formed from cellulose acetate.

8. A process according to claim 7 wherein the pressure of the solution applied against the selectively-permeable membrane is from about 10 to about 500 psig. higher than the pressure on the opposite side of the membrane.

* * * * *